United States Patent

Hall

[11] Patent Number: 5,998,592
[45] Date of Patent: Dec. 7, 1999

[54] MONOAZO DYES CONTAINING A FLUOROSULPHONYL GROUP AND USE THEREOF

[75] Inventor: Nigel Hall, Greenmount, United Kingdom

[73] Assignee: BASF Aktiengesellschaft, Ludwigshafen, Germany

[21] Appl. No.: 09/117,034

[22] PCT Filed: Dec. 16, 1996

[86] PCT No.: PCT/GB96/03093

§ 371 Date: Aug. 17, 1998

§ 102(e) Date: Aug. 17, 1998

[87] PCT Pub. No.: WO97/27247

PCT Pub. Date: Jul. 31, 1997

[30] Foreign Application Priority Data

Jan. 26, 1996 [GB] United Kingdom .................... 9601644
Apr. 12, 1996 [GB] United Kingdom .................... 9607599

[51] Int. Cl.[6] ............................. C09B 29/085; D06P 3/26; C08K 5/00
[52] U.S. Cl. .............................. 534/734; 534/581; 8/531; 8/532; 8/662; 8/922; 8/924
[58] Field of Search ............................................. 534/734

[56] References Cited

U.S. PATENT DOCUMENTS 5,739,299   4/1998   Hall ......................................... 534/739

FOREIGN PATENT DOCUMENTS

95/20014   7/1995   WIPO .

Primary Examiner—Fiona T. Powers
Attorney, Agent, or Firm—Oblon, Spivak, McClelland, Maier & Neustadt, P.C.

[57] ABSTRACT

A monoazo dye of the formula:

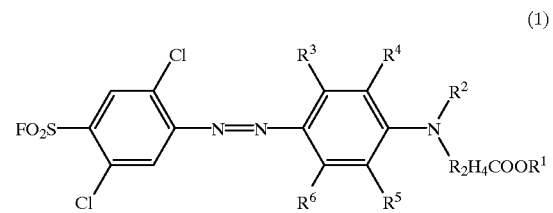

(1)

wherein:

$R^1$ represents —$C_3H_6CN$, —$C_2H_4Cl$, —$C_3H_6Cl$, —$C_2H_4OCOCH_3$ or —$C_2H_4OCOCH_2Cl$;

$R^2$ and $R^3$ each independently represent a $C_{1-4}$-alkyl group; and $R^4$, $R^5$ and $R^6$ each independently represent H, F, Cl, Br, I, —$SO_2F$, or an organic moiety selected from the group consisting of $C_{1-6}$ alkyl, $C_{1-6}$ alkoxy, $C_{1-4}$ alkanoylamino, —$NHSO_2$ alkyl, —$NHCOC_{1-4}$ alkyl and -Ophenyl moieties, each organic moiety being unsubstituted or substituted by at least one nonionic substituent.

7 Claims, No Drawings

MONOAZO DYES CONTAINING A FLUOROSULPHONYL GROUP AND USE THEREOF

This invention relates to azo dyes and more particularly to water-insoluble monoazo dyes containing the fluorosulphonyl group, to a method for their preparation and to their use for colouring synthetic textile and other materials.

Our International patent application published as WO 95/20014 describes azo compounds which contain at least one fluorosulphonyl group and are free from water-solubilising groups. The use of these compounds for colouring synthetic textile materials and for the mass coloration of plastics is also described.

It has now been found that certain dyes falling within the general class described in WO 95/20014 but not specifically disclosed therein exhibit advantageous properties when applied as disperse dyes to synthetic textile materials.

Thus, according to the invention, there are provided monoazo dyes of the formula:

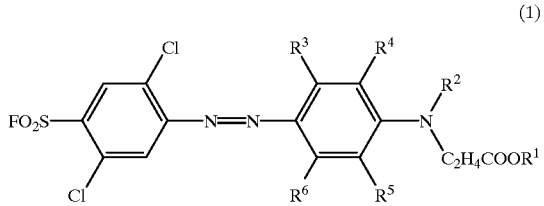

(1)

wherein:

$R^1$ represents —$C_3H_6CN$, —$C_2H_4Cl$, —$C_3H_6Cl$, —$C_2H_4OCOCH_3$ or —$C_2H_4OCOCH_2Cl$;

$R^2$ and $R^3$ each independently represent a $C_{1-6}$-alkyl group; and $R^4$, $R^5$ and $R^6$ each independently represent H, F, Cl, Br, I, —$SO_2F$, or an organic moiety selected from the group consisting of $C_{1-6}$ alkyl, $C_{1-6}$ alkoxy, $C_{1-4}$alkanoylamino, —$NHSO_2$ alkyl, —$NHCOC_{1-4}$ alkyl and -Ophenyl moieties, each organic moiety being unsubstituted or substituted by one or more nonionic substituents.

Those alkyl groups represented by $R^2$ and $R^3$ in Formula 1 which contain from 3 to 6 carbon atoms may be straight-chain or branched-chain alkyl groups but it is preferred that $R^2$ is ethyl and that $R^3$ is methyl.

Preferably at least one of $R^4$ and $R^5$ represents H, and particularly preferably both of $R^4$ and $R^5$ represent H. It is especially preferred that each of $R^4$, $R^5$ and $R^6$ represents H.

The optional nonionic substituents for groups represented by $R^4$ to $R^6$ particularly include —CN, —OH, —$OC_{1-6}$-alkyl, —$OCOC_{1-6}$-alkyl, —$COOC_{1-6}$-alkyl, phenyl, phenoxy, —OCphenyl, —$OCOphenylSO_2F$, $phenylSO_2F$, —$CO_2phenylSO_2F$ The dyes of Formula 1 may be prepared by diazotising 2,5-dichloro-4-fluorosulphonylaniline and coupling the resulting diazo compound with an aromatic amine of the formula:

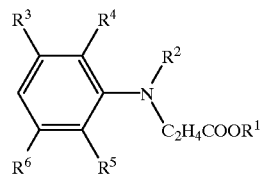

(2)

wherein $R^1$ to $R^6$ are as hereinbefore defined.

The diazotisation and coupling reactions may be performed using conditions conventionally employed for the type of reactant involved. Typically, the 2,5-dichloro4-fluorosulphonylaniline may be diazotised in an acidic medium, such as acetic, propionic or hydrochloric acid using a nitrosating agent such as nitrosylsulphuric acid, sodium nitrite or methyl nitrite at a temperature from −10° C. to 10° C. Coupling with the aromatic amine of Formula 2 may be achieved by adding the diazotised 2,5-dichloro4-fluorosulphonylaniline to the amine of Formula 2 in an alkanol, preferably a $C_{1-4}$ alkanol, such as methanol at a temperature from 0° C. to 10° C. After coupling, the compound of Formula 1 may be recovered from the reaction mixture by any convenient means such as by filtration.

The azo compounds of Formula 1 are useful as disperse dyes and are valuable for colouring synthetic textile materials and fibre blends containing such materials.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester, especially polyethylene terephthalate. Fibre blends may comprise mixtures of different synthetic textile materials or mixtures of synthetic and natural textile materials. Preferred fibre blends include those of polyester-cellulose such as polyester-cotton. The textile materials or blends thereof may be in the form of filaments, loose fibres, yarn or woven or knitted fabrics.

The azo compounds of Formula 1 or mixture thereof, optionally in conjunction with other disperse dyes, may be applied to the synthetic textile materials or fibre blends thereof by processes which are conventionally employed in applying disperse dyes to such materials and fibre blends.

Suitable process conditions include the following:

i) exhaust dyeing at a pH of from 4 to 6.5, at a temperature of from 125° C. to 140° C. for from 10 to 120 minutes and under a pressure of from 1 to 2 bar, a sequestrant may be optionally added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye may optionally be added;

iv) discharge printing (by padding the dye on to the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequestrants may optionally be added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants may optionally be added.

In all the above processes, the compound of Formula 1 or mixture thereof may suitably be applied as a dispersion comprising from 0.001% to 4% by weight of the azo compound or mixture thereof in aqueous medium.

The dye dispersions may further comprise ingredients conventionally used in coloration applications such as dispersing agents, for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the azo compound of Formula 1. Wetting agents may be used at from 0% to 20% on the weight of the azo compound of Formula 1.

Suitable dispersions may be prepared by bead milling the compound of Formula 1 with glass beads or sand in an aqueous medium.

The compounds of Formula 1 provide synthetic textile materials with red colorations exhibiting good fastness to washing, light and heat.

The azo compounds of Formula 1 are also useful for the mass coloration of plastics materials. The azo compound is generally incorporated by blending with granular or powdered plastics material by, for example, dry tumbling or high speed mixing followed by injection moulding on a screw machine or by conventional compounding/masterbatching techniques. The present dyes generally dissolve or disperse rapidly in hot plastics melts and provide bright colorations generally with good clarity and good light fastness. Plastics which may be coloured in this way include polystyrene, acrylics, styrene/acrylonitrile mixtures, acrylonitrilelbutadiene/styrene mixtures, polycarbonate, polyether-sulphone, nylons, rigid PVC (uPVC) and polypropylene.

The azo compounds of Formula 1 may also be used as colorants for the inks used in solvent-based ink-jet printing processes. These inks, typically based on ketones and/or alcohols, are useful for printing on to hydrophobic substrates such as plastics and metals.

The invention is illustrated but not limited by the following Examples in which all parts are by weight unless otherwise indicated. All λmax values were measured in CH$_2$Cl$_2$.

EXAMPLE 1

To a mixture of 2,5-dichloro-4-fluorosulphonylaniline (2 parts) and an acetic/propionic acid mixture (15 parts, 86/14 vol/vol), stirring at 0–5° C., was added dropwise nitrosylsulphuric acid solution (5 parts). The mixture was stirred at this temperature for a further 15 minutes. The diazo solution was added slowly to a mixture of N-ethyl-N-(2-(3-cyanopropoxycarbonyl)ethyl)-3-toluidine (2.6 parts), methanol (50 parts), water (20 parts) and sulphamic acid (0.5 part), stirring at 0–5° C. After stirring for 3 hours at this temperature, the product was isolated by filtration, washed with water and dried at 50° C. to yield 3-methyl-4-(2,5-dichloro-4-fluorosulphonylphenylazo)-N-ethyl-N-(2-(3-cyanopropoxycarbonyl)ethyl)aniline (2.6 parts). When applied to polyester materials from an aqueous dispersion, the dye (λmax=515 nm) gives bluish-red shades with excellent light fastness and excellent fastness to wet treatments.

The dyeings from this dye (wherein R$^1$ of Formula 1 is —C$_3$H$_6$CN) exhibit superior contact fastness compared with dyeings obtained from the dye of Example 63 of WO 95/20014 (wherein present R$^1$ is —C$_2$H$_4$CN).

EXAMPLE 2

The preparation described in Example 1 was repeated, replacing the 2.6 parts of N-ethyl-N-(2-(3-cyanopropoxycarbonyl)ethyl)-3-toluidine by 2.4 parts of N-ethyl-N-(2-(2-chloroethoxycarbonyl)ethyl)-3-toluidine. There was thus obtained a similar red dye (λmax=517 nm) which, when applied to polyester materials from an aqueous dispersion, gives bluish-red shades with excellent fastness to light and wet treatments.

EXAMPLE 3

The preparation described in Example 1 was repeated, replacing the 2.6 parts of N-ethyl-N-(2-(3-cyanopropoxycarbonyl)ethyl)-3-toluidine by 2.7 parts of N-ethyl-N-(2-(2-acetoxyethoxycarbonyl)ethyl)-3-toluidine. There was thus obtained a similar red dye (λmax=515 nm) which, when applied to polyester materials from an aqueous dispersion, gives bluish-red shades with excellent fastness to light and wet treatments.

EXAMPLE 4

The preparation described in Example 1 was repeated, replacing the 2.6 parts of N-ethyl-N-(2-(3-cyanopropoxycarbonyl)ethyl)-3-toluidine by 2.9 parts of N-ethyl-N-(2-(2-(chloroacetoxy)ethoxycarbonyl)ethyl)-3-toluidine. There was thus obtained a similar red dye (λmax=515 nm) which, when applied to polyester materials from an aqueous dispersion, gives bluish-red shades with excellent fastness to light and wet treatments.

EXAMPLE 5

The preparation described in Example 1 was repeated, replacing the 2.6 parts of N-ethyl-N-(2-(3-cyanopropoxycarbonyl)ethyl)-3-toluidine by 2.7 parts of N-ethyl-N-(2-(3-chloropropoxycarbonyl)ethyl)-3-toluidine. There was thus obtained a similar red dye (λmax=516 nm) which, when applied to polyester materials from an aqueous dispersion, gives bluish-red shades with excellent fastness to light and wet treatments.

What is claimed is:

1. A monoazo dye of the formula:

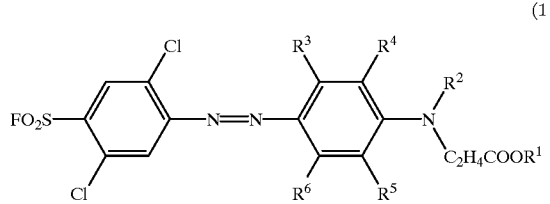

(1)

wherein:

R$^1$ represents —C$_3$H$_6$CN, —C$_2$H$_4$Cl, —C$_3$H$_6$Cl, —C$_2$H$_4$OCOCH$_3$ or —C$_2$H$_4$OCOCH$_2$Cl;

R$^2$ and R$^3$ each independently represent a C$_{1-6}$-alkyl group; and $R^4$, $R^5$ and $R^6$ each independently represent H, F, Cl, Br, I, —$SO_2F$, or an organic moiety selected from the group consisting of $C_{1-6}$ alkyl, $C_{1-6}$ alkoxy, $C_{1-4}$alkanoylamino, —$NHSO_2$ alkyl, —$NHCOC_{1-4}$alkyl and -Ophenyl moieties, each organic moiety being unsubstituted or substituted by one or more nonionic substituents.

2. A monoazo dye according to claim 1 wherein $R^2$ is ethyl and $R^3$ is methyl.

3. A monoazo dye according to claim 1, where at least one of $R^4$ and $R^5$ is hydrogen.

4. A monoazo dye according to claim 3, wherein each of $R^4$, $R^5$ and $R^6$ represents H.

5. A monoazo dye according to claim 3, wherein both $R^4$ and $R^5$ are hydrogen.

6. A method for the preparation of a monoazo dye according to claim 1 which comprises diazotising 2,5-dichloro-4-fluorosulphonylaniline and coupling the resulting diazo compound with an aromatic amine of the formula:

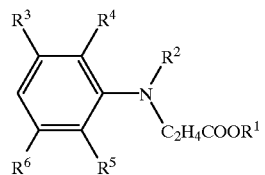

(2)

wherein $R^1$ and $R^6$ are as defined in claim 1.

7. A process for colouring a synthetic textile material or a fiber blend thereof which comprises applying thereto a monoazo dye according to any one of claims 2 or 6.

* * * * *